United States Patent [19]

Ampferer

[11] Patent Number: 4,559,783
[45] Date of Patent: Dec. 24, 1985

[54] TURBOCHARGED INTERNAL COMBUSTION ENGINE WITH ADJUSTABLE LENGTH PIPE SECTIONS

[75] Inventor: Herbert Ampferer, Bietigheim-Bissingen, Fed. Rep. of Germany

[73] Assignee: Dr. Ing. h.c.F. Porsche Aktiengesellschaft, Fed. Rep. of Germany

[21] Appl. No.: 493,202

[22] Filed: May 10, 1983

[30] Foreign Application Priority Data

May 11, 1982 [DE] Fed. Rep. of Germany ....... 3217633

[51] Int. Cl.⁴ ............................................. F02B 37/00
[52] U.S. Cl. ...................................... 60/605; 285/373
[58] Field of Search .......................... 60/605; 123/559; 285/373, 419, 236

[56] References Cited

U.S. PATENT DOCUMENTS

| | | | |
|---|---|---|---|
| 3,482,859 | 12/1969 | Bowlin | 285/373 X |
| 3,507,520 | 4/1970 | Guldener et al. | 285/373 X |
| 4,265,471 | 5/1981 | Nash | 285/373 X |
| 4,369,627 | 1/1983 | Kasting et al. | 60/605 |

FOREIGN PATENT DOCUMENTS

| | | | |
|---|---|---|---|
| 72628 | 5/1980 | Japan | 60/605 |
| 2079367 | 1/1982 | United Kingdom | 60/605 |

Primary Examiner—Michael Koczo
Attorney, Agent, or Firm—Craig & Burns

[57] ABSTRACT

A connecting line between the compressor of an exhaust gas turbocharger and a suction pipe of an internal combustion engine. For the compensation of tolerances and for the installation simplification, the connecting line includes at least two nested pipe sections disposed one within the other and cooperating by way of sealing means; the pipe sections are connected with each other by means of a disengageable device including a bridge.

13 Claims, 3 Drawing Figures

TURBOCHARGED INTERNAL COMBUSTION ENGINE WITH ADJUSTABLE LENGTH PIPE SECTIONS

The present invention relates to a connecting line between a compressor of an exhaust gas turbocharger and a suction pipe of an internal combustion engine.

A known connecting line of the aforementioned type (German Pat. No. 29 50 802) is laid-out between a suction line and an exhaust gas turbocharger in one piece as well as angularly shaped. This construction entails the disadvantage that no means are provided at the connecting line for the compensation of angular and axial tolerances.

In another prior art connecting line (German Auslegeschrift No. 14 76 837) two relatively short pipe sections are slipped one over the other, which cooperate by means of several piston-ring-like seals. Such an arrangement is not suited for a connecting line which is provided for aggregates (suction line and exhaust gas turbocharger) disposed relatively far from one another, because the pipe sections are not fastened within the connecting area which, with a longer conecting line, would lead to uncontrolled vibrations of the pipe sections and, as a consequence, to sealing problems.

It is the aim of the present invention to undertake such measures in a connecting line between a compressor of an exhaust gas turbocharger and a suction pipe of an internal combustion engine that the occurring tolerances are compensated for and the installation of the connecting line is simple.

The underlying problems are solved according to the present invention in that the connecting line includes two cooperating pipe sections nested one within the other and cooperating by way of a sealing ring, which are rigidly connected with each other by means of a bridge including detachable devices.

The advantages achieved with the present invention reside in particular in that the nested pipe sections slipped one over the other and the bridge create an easily installable and rigid connecting line (good sealing tightness), by means of which even relatively large angular and axial tolerances can be well compensated for. The shells forming the bridge are simple in construction and are supported functionally correctly at the pipe sections. The flanges serve simultaneously for the mounting of the disengageable means, which can be constituted by commercially available clamping bands. If the connecting line extends above a valve cover transversely to the internal combustion engine, then one pipe section can be readily secured thereat in a simple manner, as a result of which a good mounting of the connecting line is achieved. If finally the other pipe section has an angularly shaped configuration between the bridge and the compressor of the exhaust gas turbocharger, then a simple accommodation of the exhaust gas turbocharger, for example, in proximity of the crankcase is possible thereby.

These and other objects, features and advantages of the present invention will become more apparent from the following description when taken in connection with the accompanying drawing which shows, for purposes of illustration only, one embodiment in accordance with the present invention, and wherein.

Figure 1:
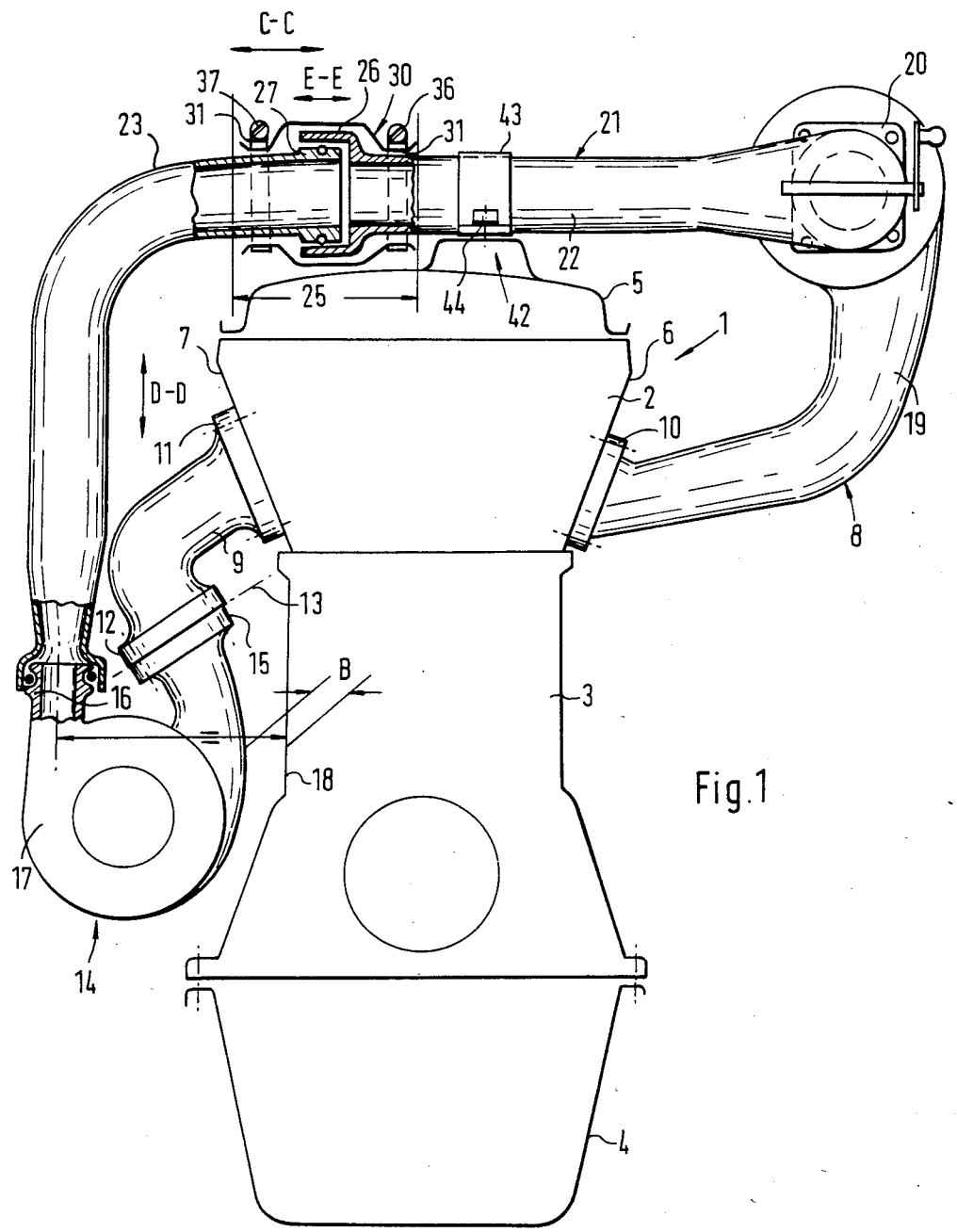
FIG. 1 is a side elevational view of an internal combustion engine with a connecting line in accordance with the present invention.

Referring now to the drawing wherein like reference numerals are used throughout the various views to designate like parts, and more particularly to FIG. 1, an internal combustion engine generally designated by reference numeral 1 is formed by a cylinder head 2, a crankcase 3 and an oil pan 4. The cylinder head 2 is provided with a valve cover 5, and a suction elbow or manifold 8. An exhaust elbow or manifold 9 is connected along the longitudinal sides 6 and 7 of the cylinder head 2. Both the suction elbow 8 and the exhaust elbow 9 are secured at the cylinder head 2 by flanges 10 and 11 and threaded means (not shown).

The exhaust elbow 9 points downwardly with a further fastening flange 12, whereby a connecting plane 13 extends obliquely to the crankcase 3 in such a manner that an exhaust gas turbocharger generally designated by reference numeral 14 which is connected to the securing flange 12, by means of a flange 15, is located as close as possible to the crankcase 3 (distance B) and that an outlet connection 16 of a compressor 17 of the exhaust gas turbocharger 14 extends approximately parallel to a vertical wall 18 of the crankcase 3. The construction of the exhaust elbow 9 makes possible a spatially favorable arrangement of the exhaust gas turbocharger 14 underneath the cylinder head 2 and adjacent the crankcase 3.

The suction elbow 8 includes an upwardly directed elbow area 19, to the end of which is connected a throttle valve assembly 20.

A connecting line generally designated by reference numeral 21 is provided between the outlet connection 16 of the compressor 17 and the remote throttle valve connection 20, i.e., at the throttle valve connection facing the longitudinal side 6; the connection line 21 extends, on the one hand, in the transverse direction C—C above the valve cover 5 and on the other hand, in the vertical direction D—D of the internal combustion engine 1.

Figure 2:
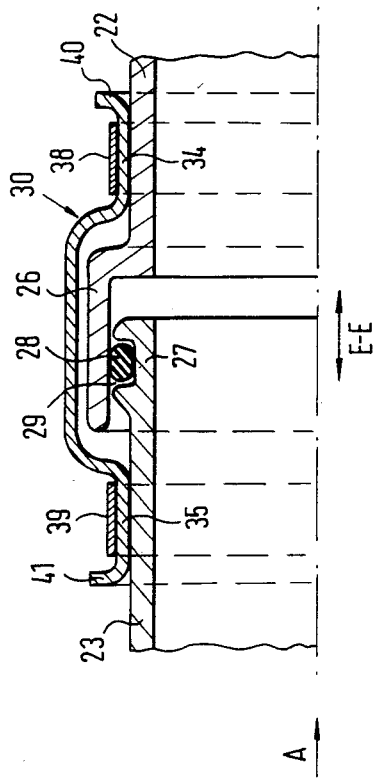
FIG. 2 is a partial cross-sectional view, on an enlarged scale, illustrating a detail of FIG. 1.

The connecting line 21 is formed by two pipe sections 22 and 23 which are nested or slipped one within the other within a connecting area 25 disposed above the valve cover 5. For this purpose, the pipe section 22 includes a female part 26 of larger diameter which extends over a connecting part 27 of the pipe section 23. The female part 26 and the connecting part 27 cooperate in a gas-tight manner by means of a sealing device 28 (FIG. 2) which is arranged in U-shaped groove 29 of the connecting part 26.

In order that the connecting line 21 which is secured at the compressor 17 of the exhaust gas turbocharger 14 and at the throttle valve connection 20, is not excited into uncontrolled vibrations within the connecting area 25, leading to leakages during the operation of the internal combustion engine, the pipe sections 22 and 23 are held in position within the connecting area 25 by means of a bridge generally designated by reference numeral 30 and by means of disengageable devices 31 (FIG. 1).

The bridge 30 is formed in the illustrated embodiment by two profiled half-shells 32 and 33 (FIG. 3) which assembled represent a body surrounding the pipe sections 22 and 23 approximately on all side thereof and are supported by means of flanges 34 and 35 at the pipe sections 22 and 23; the pipe sections 22 and 23 have identical diameters thereat so that for purposes of manufacture of the half-shells 32 and 33, only one tool is required. The disengageable devices 31 are formed by clamping bands 38 and 39 (FIG. 2) provided with screws 36 and 37 (FIG. 1) which are provided within the area of the flanges 34 and 35. The ends of the flanges 34 and 35 are provided with shoulders 40 and 41 for purposes of simplification of the installation which additionally contribute to the reinforcement of the bridge 30.

The pipe section 22 which has an essentially rectilinear configuration, is secured at the valve cover 5 at 42 (FIG. 1) by means of a member 43 partly surrounding the same in a pipe clamp-like manner and by means of bolts 44. In contrast thereto, the pipe section 23 is constructed as angularly shaped elbow which is fixedly arranged exclusively at the compressor 17 and at the bridge 30.

Figure 3:
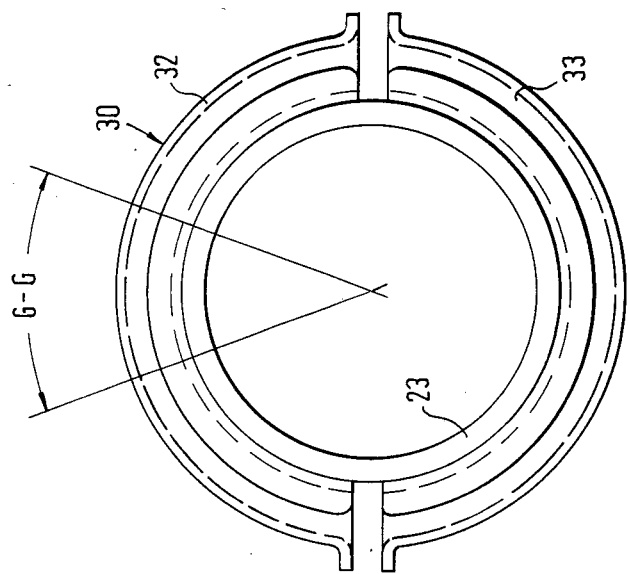
FIG. 3 is an end elevational view taken in the direction of arrow A of FIG. 2.

The installation of the connecting line 21 takes place as follows:

The pipe sections 22 and 23 are inserted one within the other and are held in position by means of the bridge 30 in such a manner that the pipe sections 22 and 23 are movable in the direction E—E (FIG. 1) and G—G (FIG. 3). Thereafter, the connecting line 21 is securely connected with the compressor 17 and the throttle valve assembly connection 20 by bolts. The tolerances which now occur in the connecting line 21 (in direction E—E and G—G) are compensated for by axial and angular movements of the pipe sections 22 and 23 within the area of the female part 26 and of the connecting part 27. Finally, the clamping bands 38 and 39 are tightened by means of screws 36 and 37.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A turbocharged internal combustion engine having a connecting line between the compressor of the exhaust gas turbocharger and a suction pipe means of the internal combustion engine, characterized in that the connecting line includes at least two nested pipe sections, one disposed within the other, wherein said two pipe sections can be secured together in any one of a number of differently extending telescoped positions by way of sealing means, said pipe sections being rigidly connected with each other in any one of said telescoped position by a connection means having disengageable means to secure said connection means to said pipe sections.

2. A connecting line according to claim 1, characterized in that the connection means is formed by two profiled half-shells which are supported at the pipe sections by flanges.

3. A connecting line according to claim 2, characterized in that the pipe sections have identical diameters within the area of the flanges.

4. A connecting line according to claim 3, characterized in that the disengageable means are formed by cooperating threaded means and clamping bands, provided within the area of the flanges.

5. A connecting line according to claim 4, characterized in that the connecting line extends at least sectionwise transversely to the internal combustion engine above a valve cover and in that one pipe section is securely retained at the valve cover.

6. A connecting line according to claim 5, in which the exhaust gas turbocharger is flangedly connected to an exhaust pipe below a cylinder head near the area of a crankcase, and characterized in that the other pipe section extends angularly shaped between the connection means and the compressor.

7. A connecting line according to claim 1, characterized in that the disengageable means are formed by cooperating threaded means and clamping bands, provided within the area of the flanges.

8. A connecting line according to claim 1, characterized in that the connecting line extends at least sectionwise transversely to the internal combustion engine above a valve cover and in that one pipe section is securely retained at the valve cover.

9. A connecting line according to claim 8, characterized in that the disengageable means are formed by cooperating threaded means and clamping bands, provided within the area of the flanges.

10. A connecting line according to claim 1, in which the exhaust gas turbocharger is flangedly connected to an exhaust pipe below a cylinder head near the area of a crankcase, and characterized in that the other pipe section extends angularly shaped between the connection means and the compressor.

11. A connecting line according to claim 10, characterized in that the connection means is formed by two profiled half-shells which are supported at the pipe sections by flanges.

12. A connecting line according to claim 11, characterized in that the pipe sections have identical diameters within the area of the flanges.

13. A turbocharged internal combustion engine having a connecting pipe between the compressor of the exhaust gas turbocharger and a suction pipe of an internal combustion engine, the connecting pipe having at least two pipe sections, a connection means between said sections and held to said sections by means of detachable devices, said pipe sections being slideable into one another so that angular and axial tolerance can be balanced, a sealing device arranged in a groove provided between a receiving part in one of said pipe sections and a connecting part in the other of said pipe sections, the connection means being formed by two profiled half shells having flanges, which flanges are supported at the pipe sections, the half shells being fastened at the pipe sections by the detachable devices in such a way that the half shells represent a body that surrounds the pipe sections almost on all sides and rigidly connect the pipe sections, said pipe sections having the same diameters in the area of the flanges, and wherein the detachable devices are provided in the area of the flanges.

* * * * *